United States Patent
Denisenko

(10) Patent No.: US 11,361,133 B2
(45) Date of Patent: Jun. 14, 2022

(54) METHOD OF REPORTING CIRCUIT PERFORMANCE FOR HIGH-LEVEL SYNTHESIS

(71) Applicant: Intel Corporation, Santa Clara, CA (US)

(72) Inventor: Dmitry N. Denisenko, Toronto (CA)

(73) Assignee: Intel Corporation, Santa Clara, CA (US)

( * ) Notice: Subject to any disclaimer, the term of this patent is extended or adjusted under 35 U.S.C. 154(b) by 1073 days.

(21) Appl. No.: 15/715,795

(22) Filed: Sep. 26, 2017

(65) Prior Publication Data

US 2019/0095566 A1 Mar. 28, 2019

(51) Int. Cl.
| | |
|---|---|
| *G06F 30/327* | (2020.01) |
| *G06F 8/41* | (2018.01) |
| *G06F 30/34* | (2020.01) |
| *G06F 30/3312* | (2020.01) |
| *G06F 30/323* | (2020.01) |
| *G06F 117/08* | (2020.01) |

(52) U.S. Cl.
CPC .............. *G06F 30/327* (2020.01); *G06F 8/41* (2013.01); *G06F 8/427* (2013.01); *G06F 30/323* (2020.01); *G06F 30/3312* (2020.01); *G06F 30/34* (2020.01); *G06F 2117/08* (2020.01)

(58) Field of Classification Search
CPC .. G06F 8/427; G06F 17/5054; G06F 2117/08; G06F 30/327; G06F 30/34; G06F 8/41
See application file for complete search history.

(56) References Cited

U.S. PATENT DOCUMENTS

| | | |
|---|---|---|
| 6,295,636 B1 | 9/2001 | Dupenloup |
| 6,336,087 B2 | 1/2002 | Burgun et al. |
| 6,519,742 B1 | 2/2003 | Falk |
| 6,748,573 B2 * | 6/2004 | Baumgartner .......... G06F 30/33 716/106 |

(Continued)

OTHER PUBLICATIONS

Papamichael et al.; "DELPHI: a framework for RTL-based architecture design evaluation using DSENT models"; 2015 IEEE International Symposium on Performance Analysis of Systems and Software (ISPASS); Conference Paper | Publisher: IEEE (Year: 2015).*

(Continued)

*Primary Examiner* — Helen Rossoshek

(57) ABSTRACT

Methods and apparatus for implementing a programmable integrated circuit using circuit design tools are provided. The circuit design tools may receive a high-level synthesis source code, parse the high-level synthesis source code to generate a compiler intermediate representation, process the compiler intermediate representation to generate a register transfer level (RTL) description, and then synthesize and compile the RTL description to generate an output netlist. Timing analysis may be performed on the output netlist to identify a critical path. Components in the critical path may be mapped back to specific portions in the RTL descriptions, to specification portions of the compiler intermediate representation, and to specific lines in the high-level synthesis source code. The designer can then optimize the high-level synthesis source code to shorten the critical path. This process may be iterated as many times as desired.

20 Claims, 10 Drawing Sheets

(56) References Cited

U.S. PATENT DOCUMENTS

| | | | |
|---|---|---|---|
| 6,996,788 B2* | 2/2006 | Akiba | G06F 30/33 716/103 |
| 7,137,078 B2 | 11/2006 | Singhal et al. | |
| 7,313,773 B1* | 12/2007 | Braun | G06F 30/33 716/103 |
| 7,350,165 B2* | 3/2008 | Miyachi | G06F 30/327 716/103 |
| 7,383,529 B2 | 6/2008 | Gupta et al. | |
| 7,454,323 B1* | 11/2008 | Bain | G06F 30/33 703/13 |
| 7,472,359 B2* | 12/2008 | Ciesielski | G06F 30/30 716/130 |
| 7,694,266 B1* | 4/2010 | Sankaralingam | G06F 30/327 716/104 |
| 7,913,203 B1* | 3/2011 | Perry | G06F 30/34 716/104 |
| 8,103,987 B2* | 1/2012 | Banerjee | G06F 30/30 716/100 |
| 8,448,150 B2* | 5/2013 | Kim | G06F 8/447 717/136 |
| 9,235,672 B2* | 1/2016 | Yasunaka | G06F 30/327 |
| 9,280,326 B1 | 3/2016 | Braun | G06F 8/37 |
| 9,378,003 B1 | 6/2016 | Sundararajan | G06F 8/4442 |
| 9,524,366 B1* | 12/2016 | Watanabe | G06F 30/327 |
| 10,007,748 B2* | 6/2018 | Titley | G06F 30/34 |
| 10,013,517 B1* | 7/2018 | Zhou | G06F 30/327 |
| 10,031,732 B1* | 7/2018 | Li | G06F 30/327 |
| 10,445,077 B2* | 10/2019 | Moiseev | G06F 8/4443 |
| 10,515,168 B1* | 12/2019 | Chauhan | G06F 30/30 |
| 10,545,739 B2* | 1/2020 | Cho | G06F 8/40 |
| 10,768,916 B2* | 9/2020 | Drepper | G06F 8/447 |
| 2001/0032067 A1* | 10/2001 | Nemani | G06F 30/327 703/14 |
| 2002/0162086 A1* | 10/2002 | Morgan | G06F 30/30 716/102 |
| 2005/0268269 A1 | 12/2005 | Coiley | |
| 2007/0028197 A1* | 2/2007 | Santoso | G06F 30/30 716/103 |
| 2012/0036138 A1* | 2/2012 | Carrion | G06F 30/327 707/748 |
| 2016/0092609 A1* | 3/2016 | Vujkovic | G06F 30/34 716/104 |
| 2016/0210156 A1* | 7/2016 | Sato | G06F 9/4401 |
| 2017/0262567 A1* | 9/2017 | Vassiliev | H03K 19/17736 |
| 2017/0323045 A1* | 11/2017 | Huang | G06F 30/34 |
| 2020/0151019 A1* | 5/2020 | Yu | G06F 9/30072 |

OTHER PUBLICATIONS

Guo et al.; "A Compiler Intermediate Representation for Reconfigurable Fabrics"; Conference Paper | Publisher: IEEE; Cited by: Papers (6) (Year: 2006).*

Nguyen et al.; "An open source Verilog front-end for digital design analysis at word level"; 2014 IEEE Fifth International Conference on Communications and Electronics (ICCE); Conference Paper | Publisher: IEEE (Year: 2014).*

Blunno et al.; "Automated synthesis of micro-pipelines from behavioral Verilog HDL"; Proceedings Sixth International Symposium on Advanced Research in Asynchronous Circuits and Systems (ASYNC 2000) (Cat. No. PR00586); Conference Paper | Publisher: IEEE (Year: 2000).*

* cited by examiner

```
// The following block of Verilog code corresponds to:
// LLVM IR instruction: %sum = add i64 %x, %y
// User source code: /home/user/project/fast_kernel.c, line 27
<many lines of Verilog code generated by high-level synthesis compiler to implement
high-throughput 64-bit adder>
```

FIG. 6B

```
logic [63:0] sum_LLVM_IR_sum\ = \add\ i64\ \%x\,\ \%y_SOURCE_fast_kernel.c\ line\ 27;
<Verilog code that assigns 64-bit variable sum_LLVM_IR_sum\ = \ add\ i64\ \%x\,\ \%y_SOURCE_fast_kernel.c\ line\ 27
the result of 64-bit addition>
```

FIG. 6C

```
logic [63:0] sum1;
<Verilog code that assigns 64-bit variable sum1 the result of 64-bit addition>
```

(an external file, a database that contains mapping from RTL variable names to LLVM IR instructions and user source code)

sum1 → %0sum = add i64 %x, %y → /home/user/project/fast_kernel.c, line 27

FIG. 6D

METHOD OF REPORTING CIRCUIT PERFORMANCE FOR HIGH-LEVEL SYNTHESIS

BACKGROUND

This relates to integrated circuits and, more particularly, to methods and apparatus for improving the performance of programmable integrated circuits, application-specific integrated circuits (ASICs), and other types of integrated circuits.

As an example, programmable integrated circuits are a type of integrated circuit that can be programmed by a user to implement a custom logic function. In a typical scenario, a logic designer uses computer-aided design tools to design a custom logic circuit based on a source code produced by the user. When the design process is complete, the computer-aided design tools generate configuration data. The configuration data is used to configure the devices to perform the functions of the custom logic circuit.

In some instances, a user designs a programmable integrated circuit by writing a high-level synthesis source code in C++. A compiler subsystem compiles the C++ source code and generates a corresponding hardware description in Verilog. A programmable logic device (PLD) design software can then be used to compile the hardware description and to generate a corresponding gate-level netlist. The PLD design software can be used to identify a critical path in the gate-level netlist that limits the performance of the programmable integrated circuit. There is, however, no way to map the components in the critical path back to the high-level synthesis source code. Thus, even when given the critical path information, the user does not know how to modify the critical path to optimize the critical path.

It is within this context that the embodiments described herein arise.

BRIEF DESCRIPTION OF THE DRAWINGS

FIGS. 6B-6D show various ways of storing mapping information in accordance with an embodiment.

DETAILED DESCRIPTION

The present embodiments relate to methods and apparatus for reporting key performance metrics using high-level design. A user may provide a high-level synthesis (HLS) source code to a design compiler. The design compiler may first generate a compiler intermediate representation and then generate a corresponding hardware description. Programmable integrated circuit design tools may then be used to generate a final netlist based on the hardware description.

The design tools may identify a critical path in the final netlist. Components in the critical path may be mapped to one or more lines in the hardware description. Each of the mapped lines in the hardware description may then be mapped to variables in the intermediate representation. Each of the mapped variables in the intermediate representation may then be mapped to one or more lines in the HLS source code. As a result, a full link from the final netlist back to the HLS source code can be established. Because the user now knows which lines in the HLS source code is actually contributing to the critical path(s), the user/designer can better optimize the performance of the HLS source code (e.g., by selectively modifying the culprit lines in the HLS code to shrink hardware, to break up complex operations, to pipeline certain data paths, etc.). This may be an iterative process. The final modified source code can then be used to generate configuration data, which can then be loaded onto device 10 to implement an optimized circuit design.

It will be recognized by one skilled in the art, that the present exemplary embodiments may be practiced without some or all of these specific details. In other instances, well-known operations have not been described in detail in order not to unnecessarily obscure the present embodiments.

Figure 1:
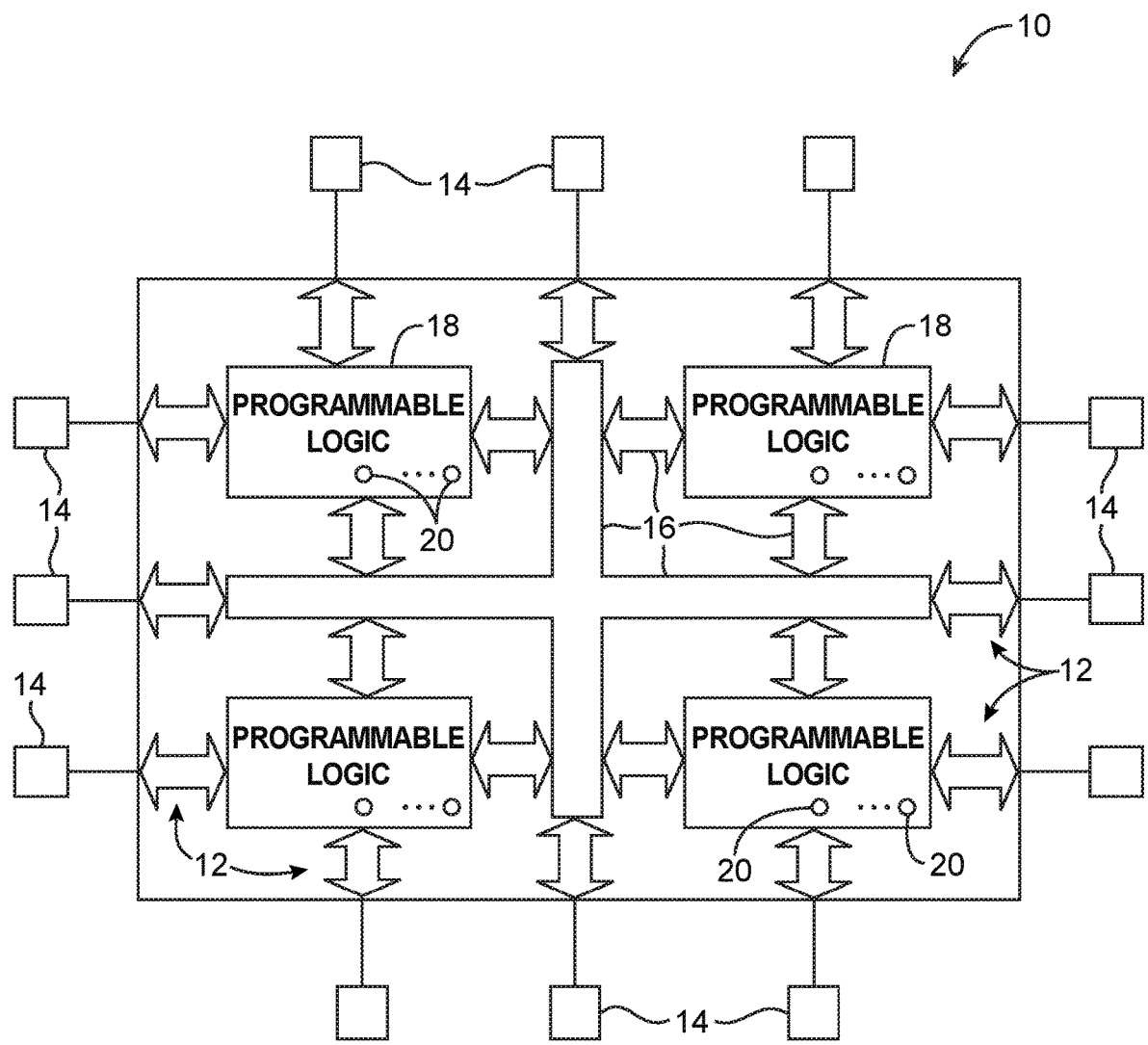
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically, the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
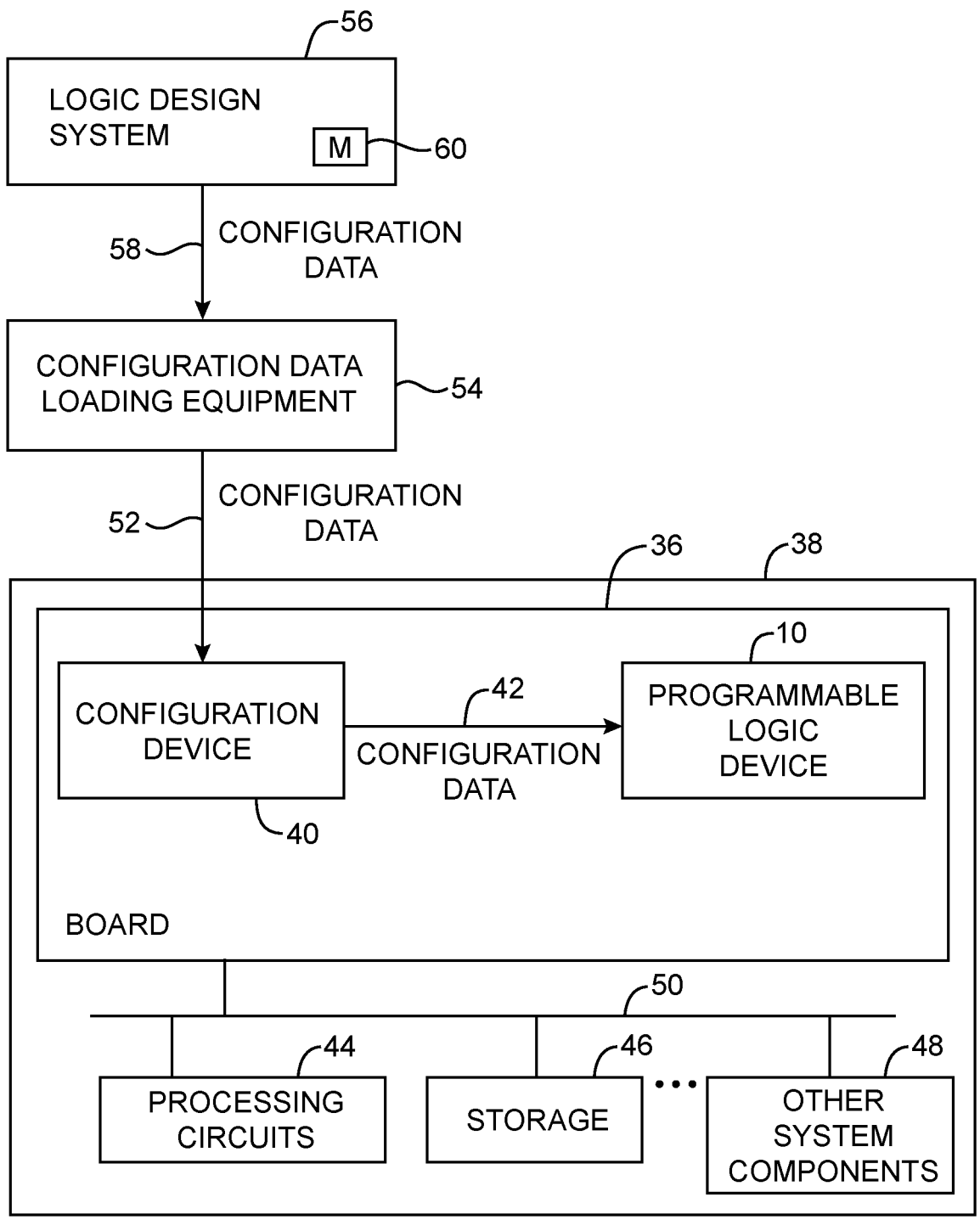
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data (sometimes referred to as a configuration bit stream) for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. System 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

Figure 3:
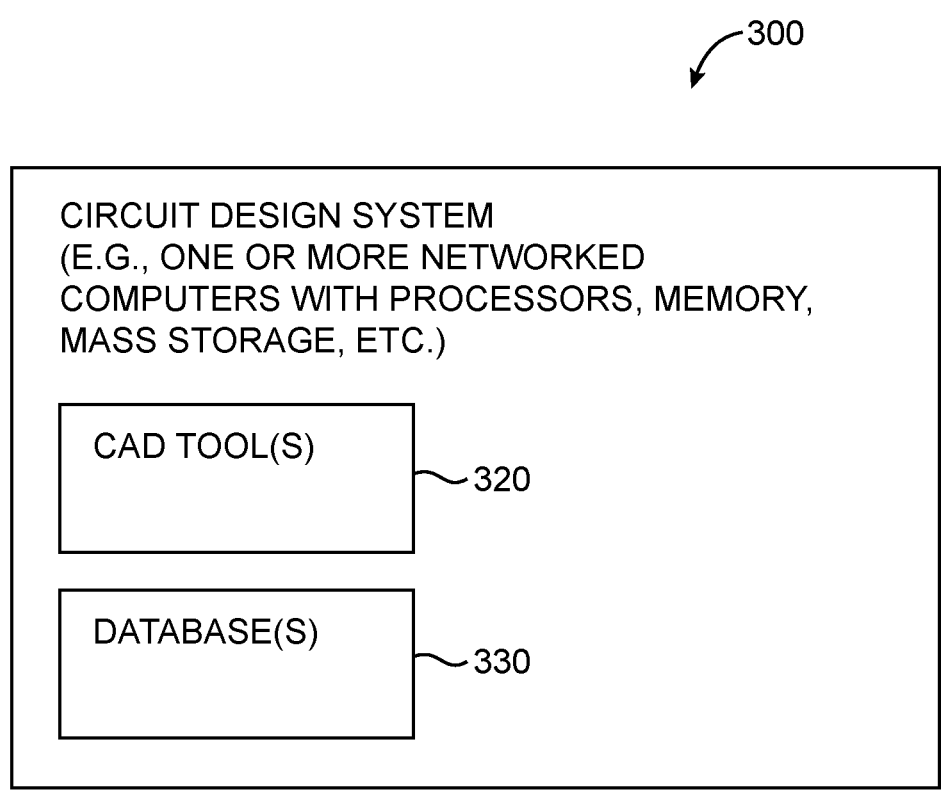
FIG. 3 is a diagram of a circuit design system that can be used to design integrated circuits in accordance with an embodiment.

An illustrative circuit design system 300 in accordance with an embodiment is shown in FIG. 3. If desired, circuit design system of FIG. 3 may be used in a logic design system such as logic design system 56 shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, or code. The non-transitory computer readable storage media may include computer memory chips such as read-only memory (ROM), non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods or processes. When performing these processes, the computing equipment is configured to implement the functions of circuit design system 300.

Computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 4:
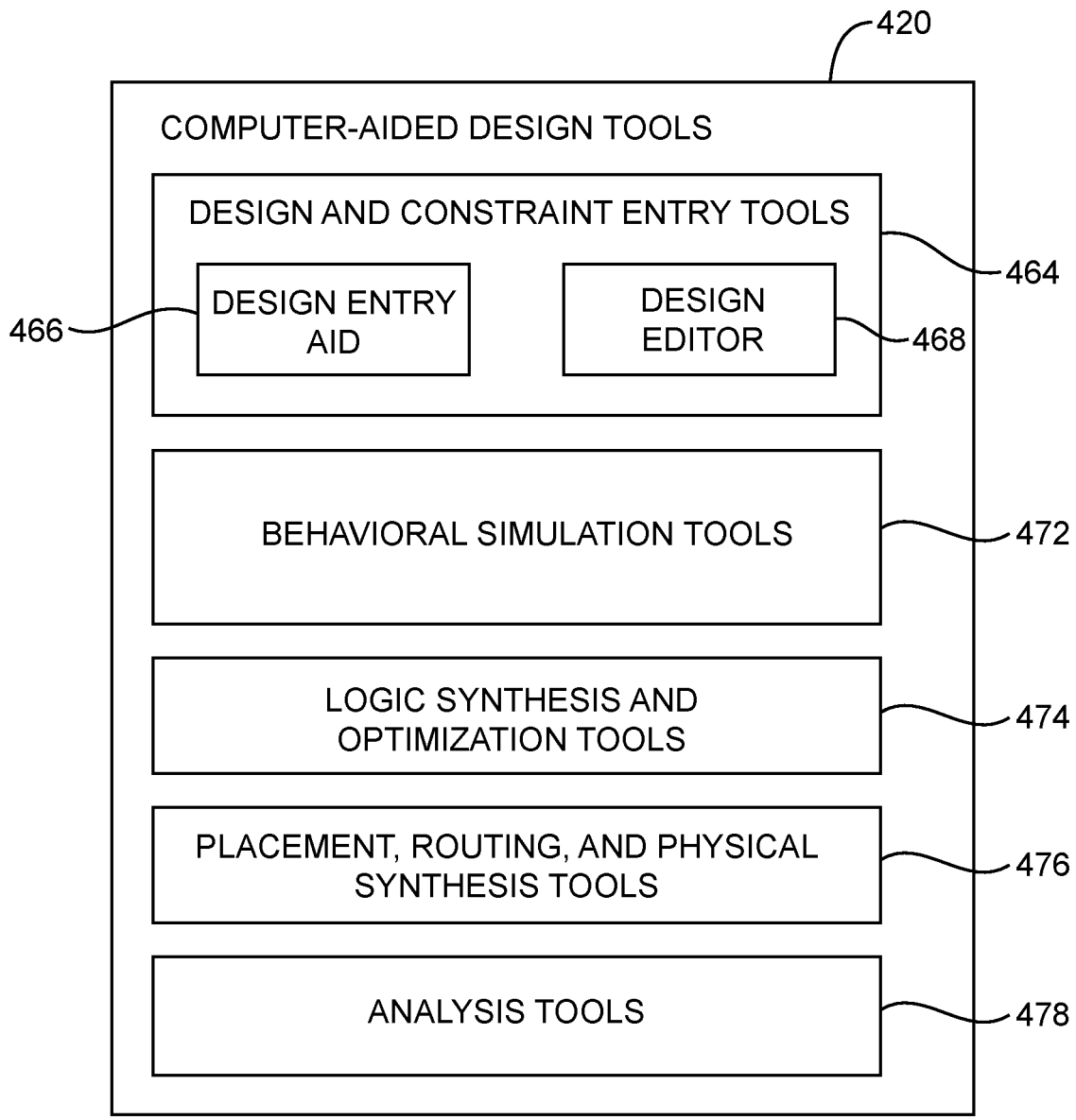
FIG. 4 is a diagram of illustrative computer-aided design (CAD) tools that may be used in a circuit design system in accordance with an embodiment.

Illustrative computer aided design tools 420 that may be used in a circuit design system such as circuit design system 300 of FIG. 3 are shown in FIG. 4.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design software application code to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL, SystemC, C/C++, just to name a few. The designer of the integrated circuit design can enter the circuit design by writing the software application code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description or a final mask-level netlist for the integrated circuit or configuration data for programming the programmable logic device.

Figure 5A:
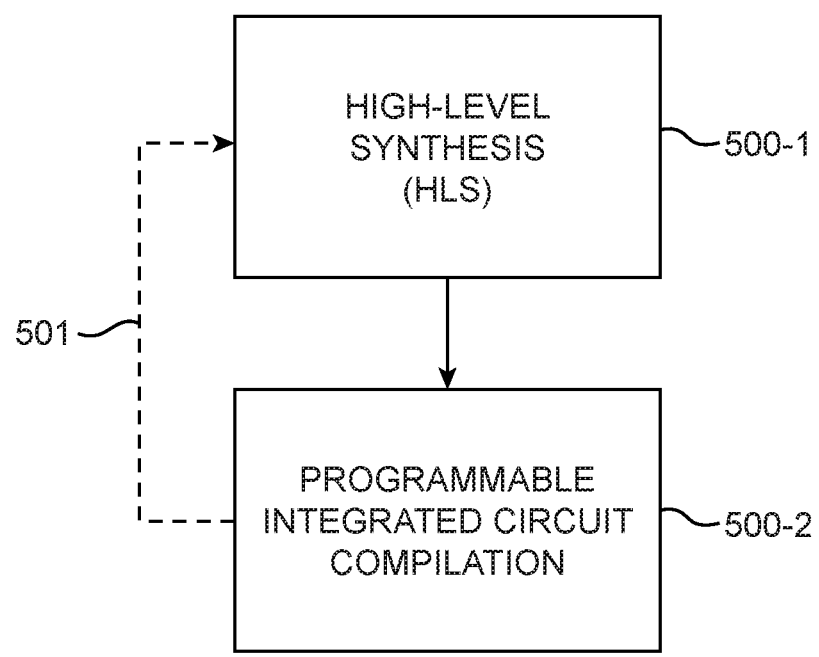
FIGS. 5A and 5B are flow charts of illustrative steps for designing an integrated circuit in accordance with an embodiment.

The steps for implementing a programmable integrated circuit 10 of the type shown in FIG. 1 may include high-level synthesis (HLS) 500-1 followed by programmable IC compilation 500-2 (see FIG. 5A). High-level synthesis 500-1 may be performed using tools 464 and 472 (sometimes collectively referred to as "HLS design tools"), which generally involve converting an HLS source code to a register transfer level (RTL) description. The RTL description may have any suitable form for describing circuit functions at the register transfer level. In general, the source code may include untimed or partially timed functional code (i.e., the application code does not describe cycle-by-cycle hardware behavior), whereas the RTL description may include a fully timed design description that details the cycle-by-cycle behavior of the circuit at the register transfer level.

Compilation 500-2 may be performed using logic synthesis and optimization tools 474, placement, routing, and physical synthesis tools 476, and analysis tools 478 (sometimes collectively referred to as "programmable IC compilation tools" or "ASIC compilation tools"), which generally involve converting the RTL description to a corresponding gate-level netlist or a mask-level netlist. Analysis tools 478 may be used to identify one or more critical paths that limit the maximum frequency ("fmax") of the circuit design. In order to increase the fmax of the overall circuit design, the delay of the critical path should be reduced. In accordance with an embodiment, a link such as link 501 that maps components associated with the critical path back to portions of the HLS source code can help increase fmax by aiding and allowing the user/designer to fine-tune relevant portions of the HLS source code.

Figure 5B:
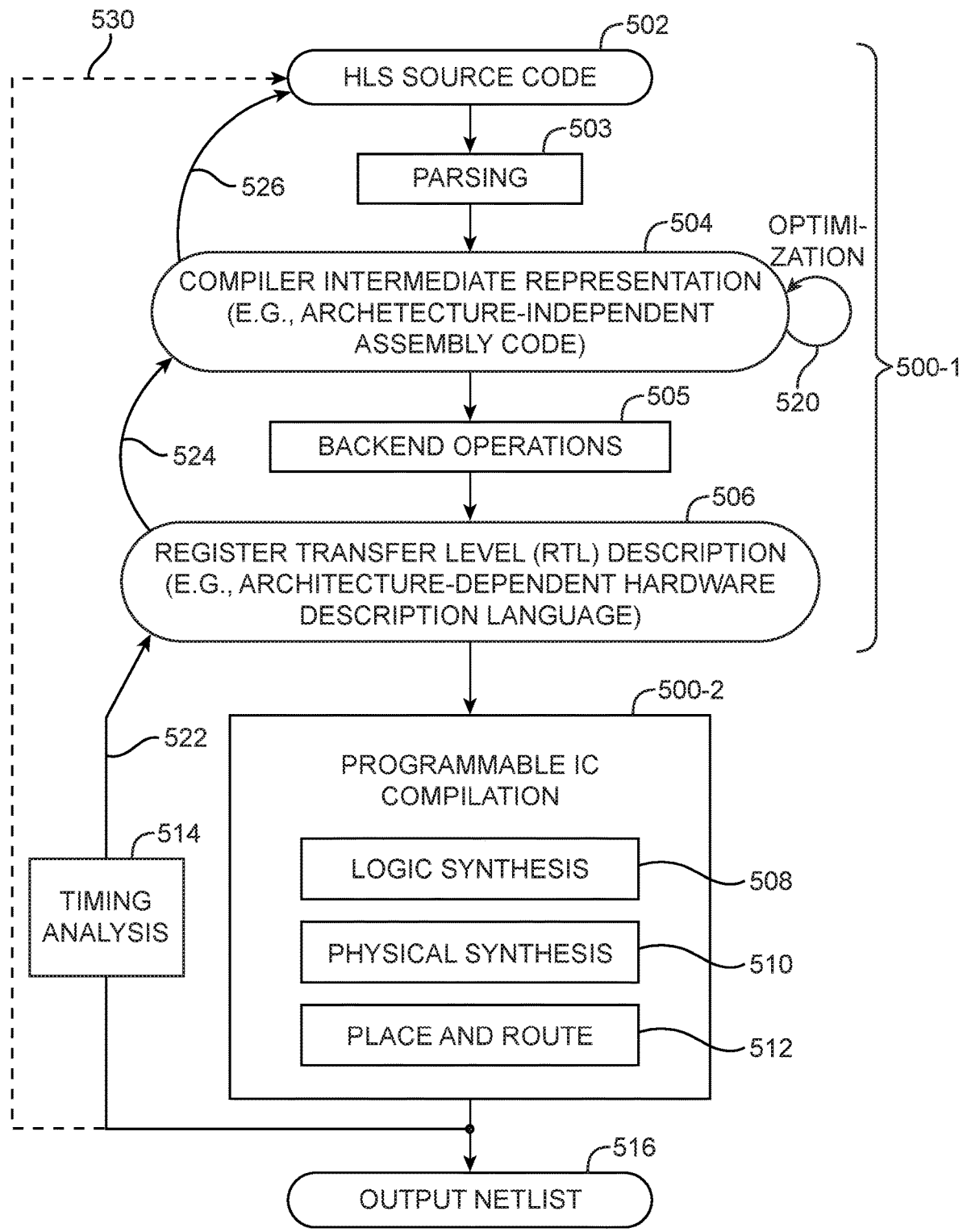

FIG. 5B is a flow chart of illustrative steps involved in implementing device 10 while reporting timing information in terms of the HLS source code. High-level synthesis 500-1 begins with the designer creating an HLS source code 502. Source code is sometimes referred to as a design or behavioral specification that is provided in the form of a software application source code 502 (e.g., C code, C++ code, SystemC code, OpenCL code, etc.).

The HLS design tools may then perform parsing operations 503 to generate a compiler intermediate representation 504. Compiler intermediate representation 504 may, as an example, be an architecture-independent assembly code. In general, one line in HLS source code 502 may generate and correspond to multiple lines in intermediate representation 504. For example, one line in HLS source code 502 may map to 10 or more variables in the architecture-independent assembly code. The HLS design tools may further perform optimization operations 520 to help improve the efficiency of the compiler intermediate representation 504.

The HLS design tools may then perform additional compiler operations sometimes referred to as "backend" operations 505 to generate an RTL description 506. RTL description 506 may, as an example, be an architecture-dependent hardware description that is expressed using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). In general, one line in intermediate representation 504 may generate and correspond to multiple lines in RTL description 506. For example, one variable in the architecture-independent assembly code 504 may be mapped to 100 or more lines in the architecture-dependent hardware description 506.

The programmable IC compilation tools may then perform compilation operations 500-2. Compilation operations 500-2 may include at least logic synthesis 508, physical synthesis 510, and place & route 512. Logic synthesis operations 508 may generate a gate-level description from hardware description 506 using logic synthesis and optimization tools 474 (FIG. 4).

Placement operations 512 may use placement tools 476 of FIG. 4 to place the different gates in the gate-level description in a preferred location on the targeted integrated circuit to meet given target placement criteria (e.g., to minimize area and maximize routing efficiency or minimize path delay and maximize clock frequency or minimize overlap between logic elements, or any combination thereof). The output of the placement operations is a placed gate-level description, which satisfies the legal placement constraints of the underlying target device.

Routing operations 512 may use routing tools 476 of FIG. 4 to connect the gates from the placed gate-level description. Routing operations may attempt to meet given target routing criteria (e.g., to minimize congestion, minimize path delay and maximize clock frequency, satisfy minimum delay requirements, or any combination thereof). The output of routing 512 is a mask-level layout description (sometimes referred to as routed gate-level description).

While placement and routing is being performed at steps 512, physical synthesis operations 510 may be concurrently performed to further modify and optimize the circuit design (e.g., using physical synthesis tools 476 of FIG. 4). Output netlist 516 may represent the routed gate-level description.

Analysis tools 478 of FIG. 4 may be used to perform timing analysis 514 on output netlist 516. Timing analysis 514 may estimate delays between synchronous or asynchronous elements of the circuit design. For example, the timing analysis tools may estimate delays between registers (e.g., based on the lengths of interconnects, intermediate combinational logic, etc.) or gates (e.g., based on the propagation delay between the node of a first gate to the node of a second gate).

In particular, the timing analysis tools may be used to identify a critical path in netlist 516. A critical path may be defined as the path with the longest signal delay between two synchronous elements in the circuit design. Since the critical path limits the fmax of the circuit design, it would be advantageous to map circuit or gate components associated with the critical path back up towards the high-level synthesis processes to help determine the root cause limiting the delay of the critical path. Timing analysis operations 522 may be capable of cross-referencing components in netlist 516 back to specific lines in the RTL description 506, as indicated by path 522. This may be an existing feature provided by the programmable IC compilation tools.

In accordance with an embodiment, the HLS design tools may be configured to cross-reference lines in RTL description 506 (e.g., specific lines in the hardware description language that contribute to the critical path as identified by step 522) back to specific lines or variables in compiler intermediate representation 504, as indicated by path 524. The HLS design tools may be further configured to cross-reference lines or variables in compiler intermediate representation 504 (e.g., specific lines in the architecture-independent assembly code as identified by step 524) back to specific lines in source code 502, as indicated by path 526. By providing the capability of linking specific portions of netlist 516 back to specific portions of RTL description 506 (step 522), linking specific portions of RTL description 506 back to specific portions of intermediate representation 504 (step 524), and linking specific portions of intermediate representation 504 back up to specific portions of HLS source code 502, a full link or mapping between output netlist 516 back up to HLS source code 502 is effectively created, as indicated by path 530.

As described above, many netlist nodes map to the same RTL instruction, and many RTL instructions map to a single line in the HLS source code. By creating full link 530, hundreds of netlist critical paths can be digested to just a few lines in the HLS source code. By carrying timing information all the way back to the source code provides better guidance on what to optimize in the HLS source code.

Figure 6A:
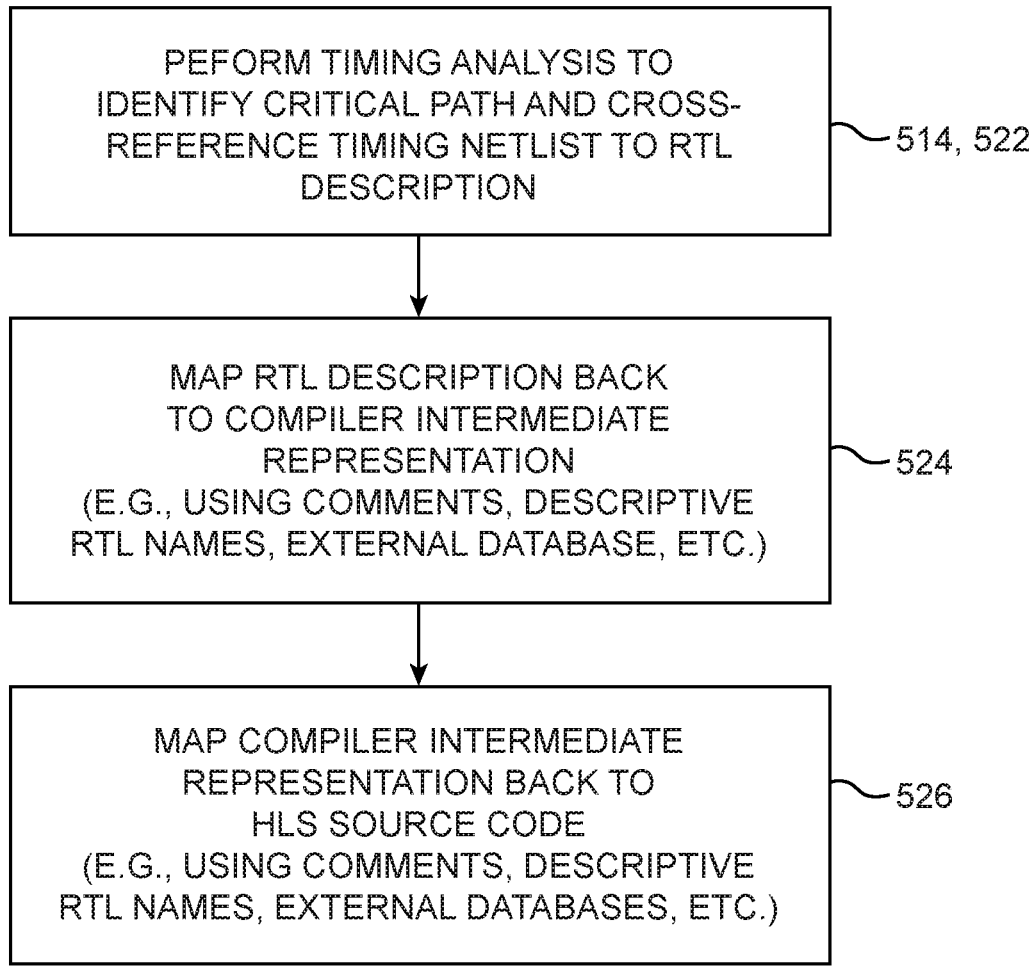
FIG. 6A is a flow chart of illustrative steps for tracking gate-level critical path components back to the high-level synthesis source code in accordance with an embodiment.

FIG. 6A is a flow chart of illustrative steps for tracking gate-level critical path components back to the high-level synthesis source code. After netlist 516 is generated, timing analysis 514 may be performed to identify one or more critical paths, and the programmable IC compilation tools may be used to cross-reference critical timing information back to RTL description 506 (step 522).

At step 524, the HLS design tools may then map RTL description 506 back to compiler intermediate representation 504. At step 526, the HLS design tools may then map compiler intermediate representation 504 back to HLS source code 526. This mapping from the RTL description back to the compiler intermediate representation and the HLS source code can be performed in various ways such as using comments, descriptive RTL names, external databases, etc.

FIG. 6B shows how the mapping can be encoded by embedding comments in the RTL code. The many lines of Verilog code implementing the 64-bit adder corresponds to the "%sum=add i64 %x, %y" instruction in the intermediate description (marked as LLVM IR instruction) and also corresponds to line 27 in the user source node.

FIG. 6C shows another example of how the mapping can be encoded by using descriptive RTL names in the RTL code. As shown in FIG. 6C, the entire string "sum_LLVM_IR_sum\=\add\i64\\%x\, \\%y_SOURCE_fast_kernel.c\line\27" is a single valid Verilog name for encoding the same information shown in FIG. 6B.

FIG. 6D shows yet another example of how the mapping can be stored using an external database. As shown in FIG. 6D, an external file may store the information that maps the 64-bit variable sum1 in the RTL code back to the "%sum=add i64 %x, %y" instruction in the intermediate description and also back to line 27 in the user source node. These examples are merely illustrative and are not intended to limit the present embodiments. If desired, other suitable ways of encoding the mapping information may be used.

Figure 7:
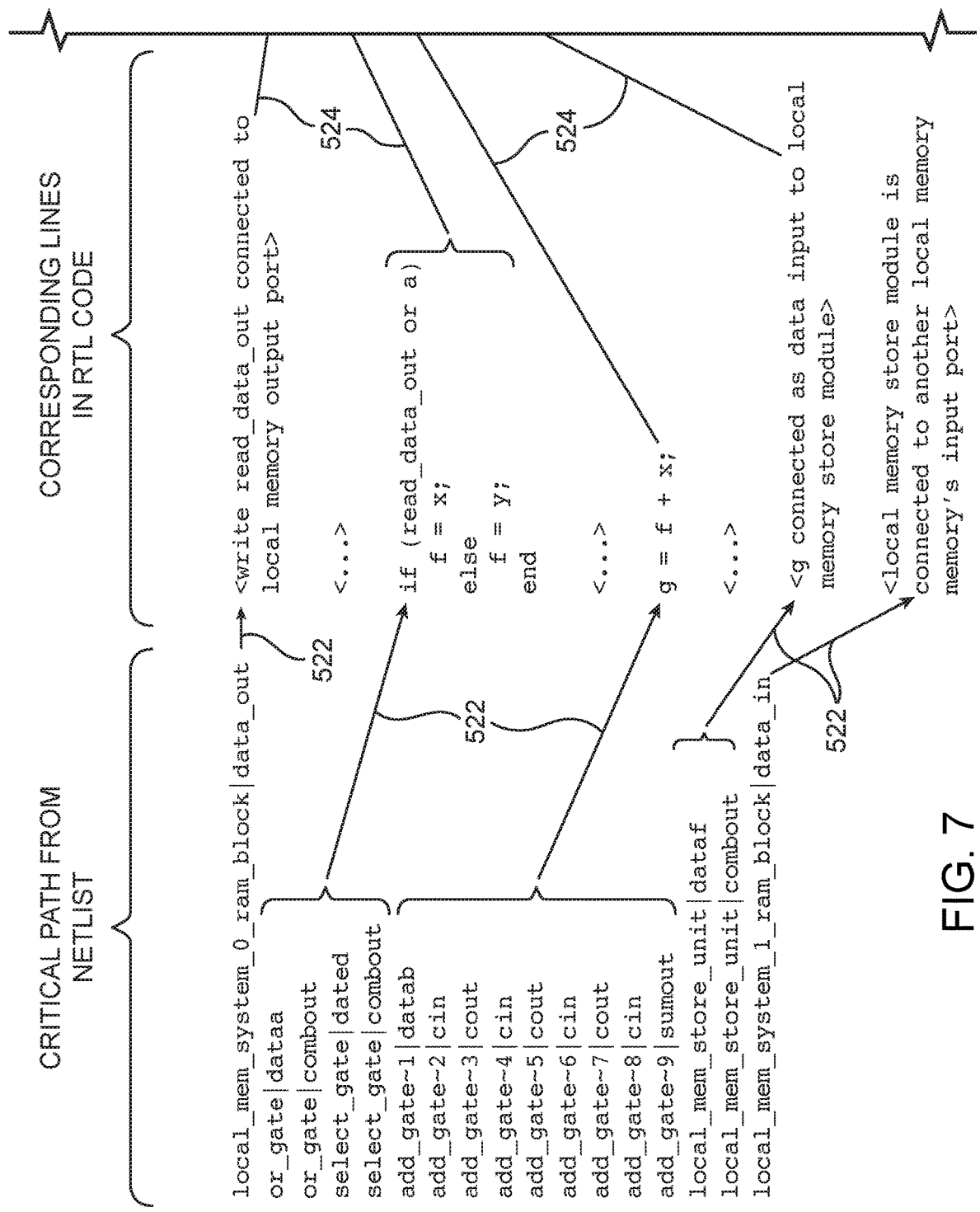
FIG. 7 is a diagram illustrating how critical path components in a netlist can be mapped back to one or more lines in the high-level synthesis source code in accordance with an embodiment.
Figure 7:
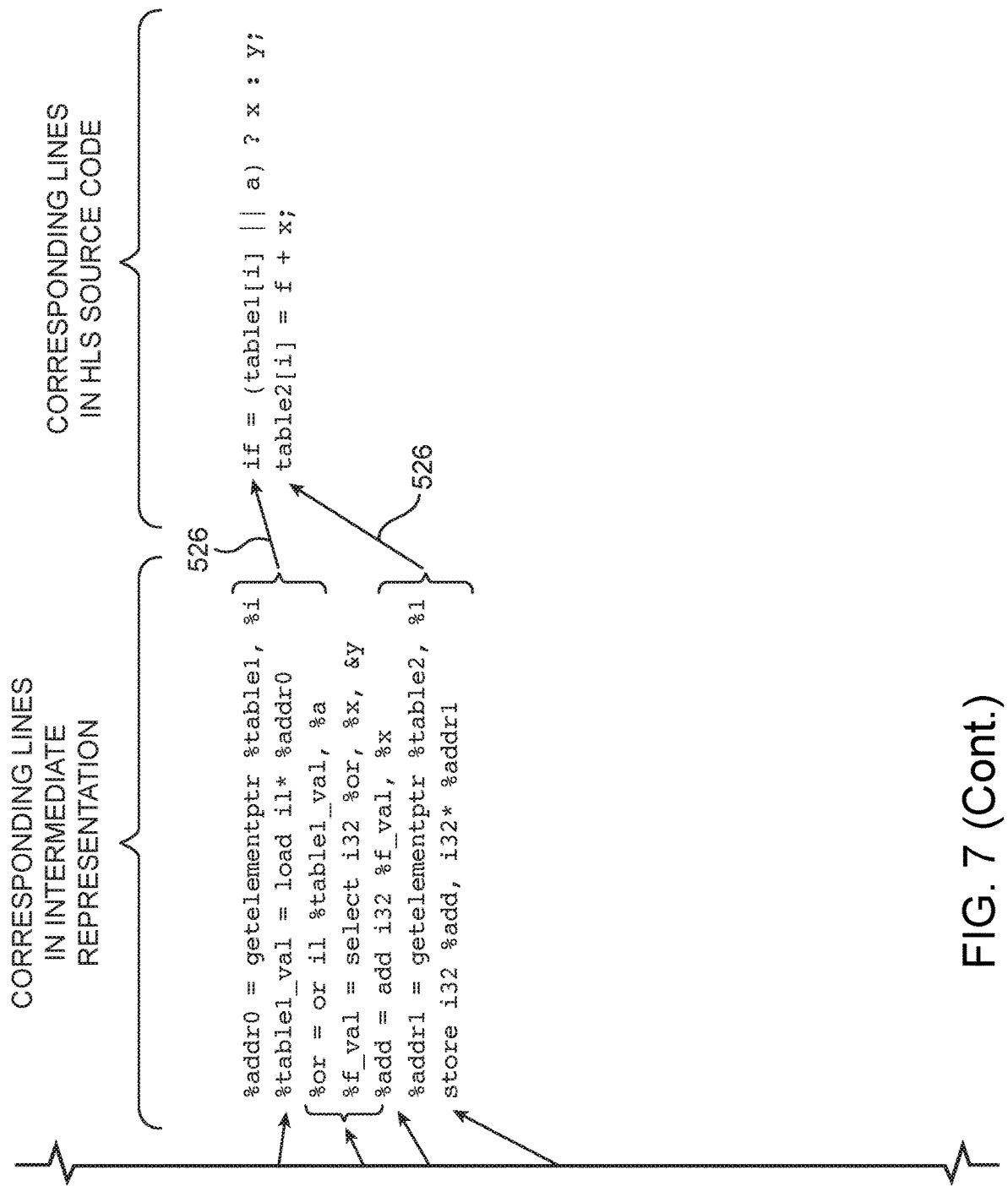

FIG. 7 is a diagram illustrating how critical path components in netlist 516 can be mapped back to one or more lines in high-level synthesis source code 502. As shown in FIG. 7, components associated with the critical paths in the netlist may be cross-referenced to specific lines in the RTL code (see mapping 522). The specific lines in the RTL code may then be cross-referenced to specific lines in the compiler intermediate assembly code (see mapping 524). The specific lines in the compiler intermediate assembly code may then be cross-references to specific lines in the high-level synthesis code (see mapping 526). This information may then be presented to the designer to help the designer further optimize the HLS source code.

For example, the designer may realize that a 64-bit adder is not necessary and may therefore replace the 64-bit adder with a 32-bit adder, which may help reduce the critical path delay. As another example, the designer may break up a complex computation into two or more parts, which can also help reduce the critical path delay. In general, any type of optimization that would increase the efficiency or performance of the critical path may be implemented.

By mapping many netlist nodes to corresponding RTL instructions, and then mapping the RTL instructions to a few number of lines in the HLS code, the user/designer can then modify those lines in the HLS source code to shorten the critical path and to improve the fmax of the overall circuit design.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is a method of implementing an integrated circuit using integrated circuit design tools, the method comprising: receiving a high-level synthesis source code; generating a compiler intermediate representation from the high-level synthesis source code; generating a register transfer level description from the compiler intermediate representation; and mapping portions of the register transfer level description to portions of the compiler intermediate representation.

Example 2 is the method of example 1, optionally further comprising generating a netlist from the register transfer level description.

Example 3 is the method of example 2, optionally further comprising performing timing analysis on the netlist to identify a critical path.

Example 4 is the method of example 3, optionally further comprising mapping components in the critical path of the netlist to the portions of the register transfer level description.

Example 5 is the method of example 1, wherein mapping the portions of the register transfer level description to the portions of the compiler intermediate representation optionally comprises using comments in the register transfer level description.

Example 6 is the method of example 1, wherein mapping the portions of the register transfer level description to the portions of the compiler intermediate representation optionally comprises using descriptive names in the register transfer level description.

Example 7 is the method of example 1, wherein mapping the portions of the register transfer level description to the portions of the compiler intermediate representation optionally comprises using an external file to store mapping information.

Example 8 is the method of any one of examples 1-7, optionally further comprising mapping the portions of the compiler intermediate representation to portions of the high-level synthesis source code.

Example 9 is the method of example 8, optionally further comprising presenting a designer with an opportunity to modify the portions of the high-level synthesis source code.

Example 10 is the method of example 9, optionally further comprising: in response to the designer modifying the portions of the high-level synthesis source code, generating configuration data based on the modified high-level synthesis source code and loading the configuration data onto the integrated circuit.

Example 11 is an integrated that is implemented using a method comprising: obtaining a high-level synthesis (HLS) source code; parsing the HLS source code to generate an architecture-independent assembly code; performing back-end operations on the architecture-independent assembly code to generate an architecture-dependent register transfer level (RTL) code; and linking lines in the architecture-dependent RTL code to lines in the architecture-independent assembly code.

Example 12 is the integrated circuit of example 11, wherein the method optionally further comprises linking the lines in the architecture-independent assembly code to a line in the HLS source code.

Example 13 is the integrated circuit of example 12, wherein the method optionally further comprises compiling and synthesizing the architecture-dependent RTL code to generate a gate-level netlist.

Example 14 is the integrated circuit of example 13, wherein the method optionally further comprises performing timing analysis on the gate-level netlist to identify a critical path.

Example 15 is the integrated circuit of example 14, wherein the method optionally further comprises allowing modification of the line in the HLS source code to shorten the critical path.

Example 16 is a non-transitory computer-readable storage medium comprising instructions for: receiving a high-level synthesis (HLS) source code; generating a hardware description from the HLS source code; generating a gate-level netlist from the hardware description; and linking critical path components in the gate-level netlist back to a line in the HLS source code.

Example 17 is the non-transitory computer-readable storage medium of example 16, wherein the instructions for generating the hardware description optionally comprises instructions for: parsing the HLS source code to generate a compiler intermediate representation; and performing back-end operations on the compiler intermediate representation to generate the hardware description.

Example 18 is the non-transitory computer-readable storage medium of any one of examples 16-17, wherein the instructions for linking the critical path components in the gate-level netlist back to the line in the HLS source code optionally comprises linking the critical path components in the gate-level netlist to a line in the hardware description.

Example 19 is the non-transitory computer-readable storage medium of example 18, wherein the instructions for linking the critical path components in the gate-level netlist back to the line in the HLS source code optionally comprises linking the line in the hardware description to a line in the compiler intermediate representation.

Example 20 is the non-transitory computer-readable storage medium of example 19, wherein the instructions for linking the critical path components in the gate-level netlist back to the line in the HLS source code optionally comprises linking the line in the compiler intermediate representation to the line in the HLS source code.

Example 21 is integrated circuit design tools running on computing equipment, comprising: means for receiving a high-level synthesis source code; means for generating a compiler intermediate representation from the high-level synthesis source code; means for generating a register transfer level description from the compiler intermediate representation; means for mapping portions of the register transfer level description to portions of the compiler intermediate representation; and means for mapping the portions of the compiler intermediate representation to portions of the high-level synthesis source code.

Example 22 is the integrated circuit design tools of example 21, optionally further comprising: means for generating a netlist from the register transfer level description; means for performing timing analysis on the netlist to identify a critical path; and means for mapping components in the critical path of the netlist to the portions of the register transfer level description.

Example 23 is the integrated circuit design tools of any one of examples 21-22, wherein the means for mapping the portions of the register transfer level description to the portions of the compiler intermediate representation optionally comprises means for embedding comments in the register transfer level description.

Example 24 is the integrated circuit design tools of any one of examples 21-22, wherein the means for mapping the portions of the register transfer level description to the portions of the compiler intermediate representation optionally comprises means for decoding descriptive names in the register transfer level description.

Example 25 is the integrated circuit design tools of any one of examples 21-22, wherein the means for mapping the portions of the register transfer level description to the portions of the compiler intermediate representation optionally comprises means for receiving mapping information from an external file.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. A method of implementing an integrated circuit using integrated circuit design tools, the method comprising:
   receiving a high-level synthesis source code;
   generating a compiler intermediate representation from the high-level synthesis source code;

generating a register transfer level description from the compiler intermediate representation;

generating a netlist of a circuit design for the integrated circuit from the register transfer level description;

performing timing analysis on the netlist to identify a critical path that limits a maximum frequency of the circuit design;

mapping components in the critical path of the netlist to the register transfer level description; and mapping portions of the register transfer level description that contribute to the critical path to portions of the compiler intermediate representation.

2. The method of claim 1, wherein the compiler intermediate representation comprises assembly code.

3. The method of claim 1, wherein generating the register transfer level description from the compiler intermediate representation comprises performing backend operations on the compiler intermediate representation to generate register transfer level description.

4. The method of claim 1, wherein the critical path is a path with a longest signal delay between two synchronous elements in the circuit design.

5. The method of claim 1, wherein mapping the portions of the register transfer level description to the portions of the compiler intermediate representation comprises using comments in the register transfer level description.

6. The method of claim 1, wherein mapping the portions of the register transfer level description to the portions of the compiler intermediate representation comprises using descriptive names in the register transfer level description.

7. The method of claim 1, wherein mapping the portions of the register transfer level description to the portions of the compiler intermediate representation comprises using an external file to store mapping information.

8. The method of claim 1, further comprising mapping the portions of the compiler intermediate representation to portions of the high-level synthesis source code.

9. The method of claim 8, further comprising presenting a designer with an opportunity to modify the portions of the high-level synthesis source code.

10. The method of claim 9, further comprising:
in response to the designer modifying the portions of the high-level synthesis source code, generating configuration data based on the modified high-level synthesis source code and loading the configuration data onto the integrated circuit.

11. The method of claim 1, wherein mapping the portions of the register transfer level description to the portions of the compiler intermediate representation further comprises linking lines in the register transfer level description back to lines in the compiler intermediate representation.

12. The method of claim 8, wherein mapping the portions of the compiler intermediate representation to the portions of the high-level synthesis source code further comprises cross-referencing lines in the compiler intermediate representation back to specific lines in the high-level synthesis source code.

13. An integrated circuit that is implemented using a method comprising:
obtaining a high-level synthesis (HLS) source code;
parsing the HLS source code to generate a compiler intermediate representation that comprises assembly code;
performing backend operations on the compiler intermediate representation to generate register transfer level (RTL) code;
compiling and synthesizing the RTL code to generate a gate-level netlist of a circuit design for the integrated circuit;
performing timing analysis on the gate-level netlist to identify a critical path that limits a maximum frequency of the circuit design;
mapping components in the critical path of the gate-level netlist to the RTL code; and
linking lines in the RTL code that contribute to the critical path to lines in the compiler intermediate representation.

14. The integrated circuit of claim 13, wherein the method further comprises linking the lines in the compiler intermediate representation to a line in the HLS source code.

15. The integrated circuit of claim 13, wherein the critical path is a path with a longest signal delay between two synchronous elements in the circuit design.

16. The integrated circuit of claim 13, wherein the method further comprises presenting a designer with an opportunity to modify the HLS source code.

17. The integrated circuit of claim 14, wherein the method further comprises allowing modification of the line in the HLS source code to shorten the critical path.

18. A non-transitory computer-readable storage medium comprising instructions for:
receiving a high-level synthesis source code;
generating a compiler intermediate representation from the high-level synthesis source code;
generating a register transfer level description from the compiler intermediate representation;
generating a netlist of a circuit design for an integrated circuit from the register transfer level description;
performing timing analysis on the netlist to identify a critical path that limits a maximum frequency of the circuit design;
mapping components in the critical path of the netlist to the register transfer level description; and
mapping portions of the register transfer level description that contribute to the critical path to portions of the compiler intermediate representation.

19. The non-transitory computer-readable storage medium of claim 18 further comprising instructions for mapping the portions of the compiler intermediate representation to portions of the high-level synthesis source code.

20. The non-transitory computer-readable storage medium of claim 19, further comprising instructions for:
presenting a designer with an opportunity to modify the portions of the high-level synthesis source code; and
in response to the designer modifying the portions of the high-level synthesis source code, generating configuration data based on the modified high-level synthesis source code and loading the configuration data into the integrated circuit.

* * * * *